H. SCHERER.
BALL AND SOCKET ATTACHMENT FOR CHAINS.
APPLICATION FILED JAN. 3, 1914.
1,153,451.
Patented Sept. 14, 1915.
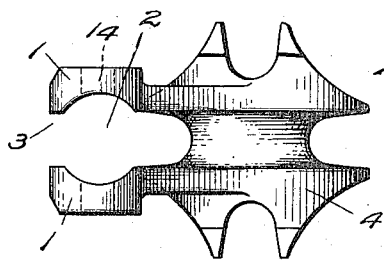
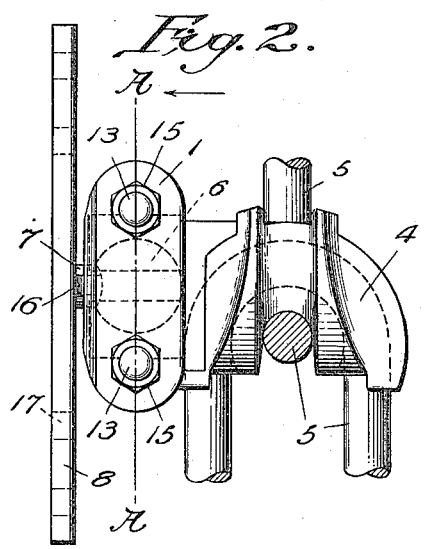
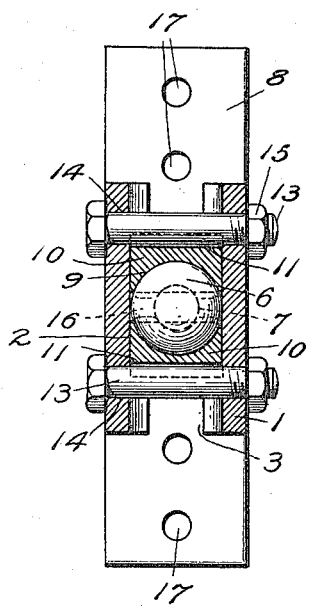
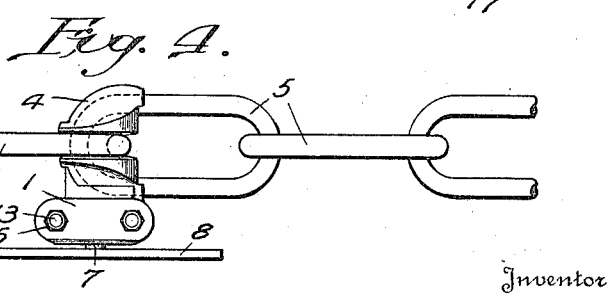
Witnesses
E. S. Grumman
J. Austin Stone
Inventor
Henry Scherer
By Clark, Prentis & Clark
Attorneys

UNITED STATES PATENT OFFICE.

HENRY SCHERER, OF BILLINGS, MONTANA.

BALL-AND-SOCKET ATTACHMENT FOR CHAINS.

1,153,451. Specification of Letters Patent. Patented Sept. 14, 1915.

Application filed January 3, 1914. Serial No. 810,182.

*To all whom it may concern:*

Be it known that I, HENRY SCHERER, a citizen of the United States, residing at Billings, in the county of Yellowstone and State of Montana, have invented new and useful Improvements in Ball-and-Socket Attachments for Chains, of which the following is a specification.

This invention relates to an improvement in ball and socket joints and more particularly to the peculiar construction of the parts and method of assembling them.

One object of the invention is to provide a ball and socket connection which may be quickly assembled or taken apart.

Another object of the invention is to provide a ball and socket joint, composed of a small number of parts, for use in connection with endless conveyer lines.

A further object of the invention is to provide a ball and socket connection between the buckets of an endless conveyer system and the bearing pieces between the chain links used in that type of endless conveyer employing Dodge chains.

The invention consists in the novel construction and arrangement of parts illustrated in the accompanying drawings and described and claimed in the following specification and claims.

In the drawings—Figure 1 is a view of a bearing block used in Dodge chains, giving an end view of an attached body block with its longitudinal bore. Fig. 2 is a side view of the same block illustrating the ball and socket joint with the ball in outline. Fig. 3 is a sectional view taken along the line A—A of Fig. 2, in the direction of the arrow. Fig. 4 is a view illustrating the use of the ball and socket joint bearing block as used with conveyer chain. Fig. 5 is a section through one of the concave follow blocks of the socket showing the groove. Fig. 6 is a side view of a follow block showing the groove in outline and illustrating the opening on the side for the neck of the ball.

Referring to the drawings, like parts are designated by like reference numerals.

1 represents a main body block provided with a longitudinally extending bore 2 (Fig. 1) and having one side formed with the slotted opening 3 extending to the bore 2 and the other side extended and enlarged to form a bearing block 4 for use between the links of conveyer chains 5. The ball 6 (Figs. 2 and 3) having a diameter a little less than the bore 2 of body block 1 is provided with a neck 7 extending therefrom and terminating in any desired shape but illustrated herein as joining a flat plate 8 such as could be fastened to an endless conveyer bucket. The bearing surfaces for the ball 6 are provided by the concave faces 9 (Figs. 5 and 6) of the follow blocks 10. These blocks are round and have a diameter substantially the same as the ball 6 and are provided on one side with the concave bearing surfaces 9 and on the other with the groove 11. It will be noticed that provision is made by the notch 12 for the protrusion of the neck 7 of the ball 6 from within the follow block.

The parts are assembled in the following manner: The ball 6 is inserted into the bore 2 of the body block 1, the neck 7 sliding in and extending through the opening 3. Then the round follow blocks 10 are inserted in the bore 2 on either side of the ball 6, the bolts 13 are passed through the openings 14 in the body block, through the grooves 11 in the blocks 10, and fastened with the nuts 15. It will be seen that by locking the follow blocks 10 in position by means of the bolts 13 and grooves 11 (Figs. 2 and 3) positive bearing surfaces are provided for the ball 6 and any removal of parts is prevented until the bolts 13 have been withdrawn.

The ball 6 may be attached either to the plate 8 bolted to a bucket, as illustrated in the drawings, or may be formed as an extension of the bearing block 4. In the latter case the body block and horizontal bore would be attached to the bucket plate 8 and the parts would be assembled in the same manner as has just been described.

Shoulders 16 are formed on opposite sides of the neck 7 to strengthen the same, and suitable holes 17 are provided in the plate 8 to permit the attachment to any object.

The ball and follow blocks may be inserted into the bore from either end thereof, or one of the fastening bolts may be placed in position first and the blocks and ball inserted from the other end. It will be observed that the bolts 13 serve not only to keep the follow blocks 10 in fixed relation to the bore 2 and body block 1 but also brace the two sides of the body block 1 against spreading and widening of the slot 3.

In the use of endless conveyer machinery trouble has been experienced in buckets and bucket attaching means. Buckets have been fastened by rivets to the bearing blocks used in Dodge chains but the unceasing vibration and wear incident to the travel of the carrier has usually caused crystallization of the metal and subsequent breakage. The broken part would then have to be removed and a new one attached, necessitating cutting of rivets or at least the removal of a large number of bolts. Often this work had to be done under very awkward circumstances and trying conditions. My invention avoids these strains by allowing for play in the ball and socket joint as well as supplying a quick method of uncoupling or attaching the conveyer bucket to the chain bearing block.

It will be further seen that my arrangement of parts permits the introduction of the ball to the body block from either side or from an angle, whereas in the old form the rivet or bolt holes of the parts would have to be in perfect alinement before the parts could be coupled.

Changes in size and proportion of parts and attachments may be made without departing from the scope of my invention.

What I claim and desire to secure by Letters Patent is:—

1. A ball and socket connection comprising a body block having a longitudinal bore therein with at least one end open, and a slot in one side of said body block open centrally to said bore and extending substantially the length of said bore, a ball within said bore having a neck extending through said slot, the diameter of the ball being greater than the width of the slot, follow blocks on either side of said ball and fastening means passing through said body block and bore engaging the rear walls of said follow blocks to hold the same in fixed relation to said fastening means.

2. A ball and socket connection comprising a body block having a longitudinal bore therein with at least one open end, a slot in one side of said body block open centrally to said bore and extending substantially the length of said bore, a ball within said bore having a neck extending through said slot, the diameter of the ball being greater than the width of the slot, follow blocks on either side of said ball each block having a groove on its rear face, and fastening means passing through said body block and bore to engage said grooves and hold said follow blocks in fixed relation to said fastening means.

3. A ball and socket connection comprising a body block having a longitudinal bore therein with at least one open end, a slot in one side of said body block open centrally to said bore and extending the length thereof, a ball within said bore having a neck extending through said slot, the diameter of the ball being greater than the width of the slot, follow blocks on either side of said ball, and means passing through width of the slot, follow blocks on either side of said ball, and means passing through said body block and bore in a plane substantially perpendicular to the plane of said slot, engaging the rear walls of said follow blocks to reinforce the walls of said body block and hold the follow blocks in fixed relation thereto.

4. A ball and socket connection comprising a body block having a longitudinal bore therein with at least one open end for the reception of a ball, a slot in one side of said body block, extending centrally into said bore and the length thereof, a ball within said bore having a neck extending through said slot, follow blocks on either side of said ball and means passing through said body block and bore engaging the rear walls of said follow block to hold the same in fixed relation to said body block.

5. A ball and socket connection comprising a body block having a longitudinal bore therein with at least one open end for the reception of a ball, a slot in one side of said block extending centrally to said bore and the length thereof, a ball within said bore having a neck extending through said slot, bearing members on either side of said ball, and means passing through said body block and bore to reinforce the walls of said body block.

6. A ball and socket connection comprising a body block having a longitudinal bore therein with at least one open end for the reception of a ball, a slot in one side of said block extending centrally to said bore and the length thereof, a ball within said bore having a neck extending through said slot, bearing members on either side of said ball, means passing through said body block and bore to reinforce the walls of said body block, and an extension from one part of said connection forming a bearing block for chain links.

7. A ball and socket connection comprising a body block having a longitudinal bore therein with at least one end open, a slot in one side of said body block open centrally to said bore and extending substantially the length thereof, a ball within said bore having a neck extending through said slot, the diameter of the ball being greater than the width of the slot, follow blocks on either side of said ball, and fastening means passing through said body block and retaining said follow blocks therein.

In testimony whereof I have hereunto set my hand in presence of two subscribing witnesses.

HENRY SCHERER.

Witnesses:
WILLIAM SMITH GARNSEY, Jr.,
I. FLETCHER GODDARD.